United States Patent

[11] 3,614,609

| | | |
|---|---|---|
| [72] | Inventors | Grubel, Stanley J.<br>Wappingers Falls;<br>Hugh R. Stirling, Poughkeepsie, both of N.Y. |
| [21] | Appl. No. | 27,341 |
| [22] | Filed | Apr. 10, 1970 |
| [45] | Patented | Oct. 19, 1971 |
| [73] | Assignee | International Business Machines Corporation<br>Armonk, N.Y. |

[54] GO/NO-GO TIMES CIRCUIT USING A TUNNEL DIODE TO SAMPLE A TEST WAVEFORM
3 Claims, 2 Drawing Figs.

[52] U.S. Cl. .................................................. 324/77 A,
307/258, 324/158 R
[51] Int. Cl. .................................................... G01r 19/00,
H03k 17/58
[50] Field of Search .................................. 324/77 R,
77 A, 121, 102, 158 R; 307/258; 328/151, 186;
315/25

[56] References Cited
UNITED STATES PATENTS
3,317,743  5/1967  Rogers ........................ 328/186 X OTHER REFERENCES
Ward, T. D.; Tunnel Diode Switch...; IBM Technical Disclosure Bulletin; Vol. 4; No. 7; Dec. 1961; pg. 54; copy in 307/258

*Primary Examiner*—Rudolph V. Rolinec
*Assistant Examiner*—Ernest F. Karlsen
*Attorneys*—Hanifin and Jancin and J. Jancin, Jr.

ABSTRACT: An improvement to a system for measuring (a) the voltage level of a waveform at a specific time with respect to a reference point in time, (e.g., clock or sync pulse) and (b) the time required with respect to a reference time for a waveform to reach a specific voltage level. In the first case, the voltage at a given sample time is measured, while in the second case, the time to a given voltage is measured. The system incorporates a go/no-go decision circuit which determines if the characteristics of a circuit under test satisfy certain reference criteria. The go/no-go circuit comprises a discriminator which examines a test signal for both amplitude and time. The discriminator compares the level of the input test signal with a reference signal at the time of strobe occurrence. The condition of the discriminator is monitored by a detector circuit which further passes this condition on to a voting logic which makes a go/no-go decision based on a plurality of samples.

3,614,609

INVENTOR
STANLEY J. GRUBEL
HUGH R. STIRLING

BY Victor Siber
AGENT 3,614,609

GO/NO-GO TIMES CIRCUIT USING A TUNNEL DIODE TO SAMPLE A TEST WAVEFORM

FIELD OF THE INVENTION

This application incorporates by reference U.S. application Ser. No. 663,710 filed Aug. 28, 1967, now U.S. Pat. No. 3,505,598, entitled "Pulse Measuring System."

This invention relates to an electrical measuring system for determining transient or dynamic characteristics of electrical systems, e.g., integrated logic devices, transistors and the like, where the times of delay, rise, turn on, storage and turnoff times within which the system responds are significantly important. Accordingly, the invention is more particularly related to a system for waveform analysis including the measurement of rise time, pulse length, pulse height, and other parameters of the time response of electrical devices and systems.

More particularly, this invention relates to an improvement in the sampling circuit of the pulse measuring system of the above referenced patent application. In that application, FIG. 1 discloses a block diagram of a system for carrying out various measurements for devices which are to be tested. In the system, there is shown a sampling circuit 12 for making a decision about the amplitude of a waveform 10 at the time of a strobe occurrence. Furthermore, FIGS. 13 and 14 of the above referenced patent application shows modifications of sampling circuit 12 and decision circuit 27.

The present application is an improvement to the sampling circuit 12 and decision circuit 27 shown in FIG. 14 of the above-referenced patent application, which circuits are used in the pulse measuring system.

BACKGROUND OF THE INVENTION

As required in the prior art system of U.S. Pat. application Ser. No. 663,710, now U.S. Pat. No. 3,505,598, the input test signal which is to be examined either as to amplitude or as to time, must be introduced to a sampling circuit which further outputs a signal to a decision circuit. In this prior art system sampling takes place under the control of a strobe pulse. If the sum of the input test signal end and a bias signal in combination with the strobe is above a specific threshold, a monostable switches state. This change of condition is stored in a bistable component which must be reset by an inverse signal of strobe pulse. This sampling circuit is shown in FIG. 14 of the above-referenced patent application. As indicated in this circuit diagram, it is necessary for the system to generate two strobe pulses in order to achieve high-speed sampling. A first strobe to switch the monostable component on and a second reset strobe to switch the bistable component off. The output of the bistable component is then introduced into a decision circuit that examines the existence or nonexistence of a desired sample during the strobe time.

This type of circuit has limitations with respect to bandwidth or frequency at which sampling may be performed due to the conductive elements in the sampling circuit. Also, the bandwidth of the sampling circuit is further limited by the sampling circuit that is needed to generate the two strobe pulses. Furthermore, there is a requirement for two switching elements and the generation of two strobe pulses. These two elements introduce a criticality as to the time occurrence of the strobes, thus adversely affecting the time stability of the system. Furthermore, the delay of the strobe pulse which is needed to correlate the strobing of the monostable component with the reset of the bistable component, adversely increases the width of the pulse.

Therefore, it is an object of the present invention to provide an improved sampling circuit to be used in a pulse measuring system.

It is a further object of the present invention to increase the bandwidth of the sampling circuit of a pulse measuring system.

It is a further object of the present invention to increase the reliability of a go/no-go decision circuit by a single tunnel diode discriminator and voting logic.

It is a further object of the present invention to reduce the number of switching elements required in a sampling circuit.

It is a further object of the present invention to improve both level and time stability of a sampling circuit.

SUMMARY OF THE INVENTION

In the present invention a discriminator is provided which examines a test signal for both amplitude and time under the control of a strobe pulse which varies in time under the control of an electronic delay.

A single tunnel diode discriminator compares the level of a test signal with a reference signal level at the time of strobe occurrence. If the test signal is greater than the reference signal level, the tunneled diode discriminator switches state. The discriminator is connected to a detector stage which senses the change in state of the tunnel diode discriminator and passes this information as an output signal and furthermore provides a feedback reset signal to the discriminator. The output signal of the detector is introduced into a voting logic circuit which examines the frequency of discriminator ON cycles and makes a go/no-go decision based on a predetermined frequency.

DESCRIPTION OF THE INVENTION

Figure 1:
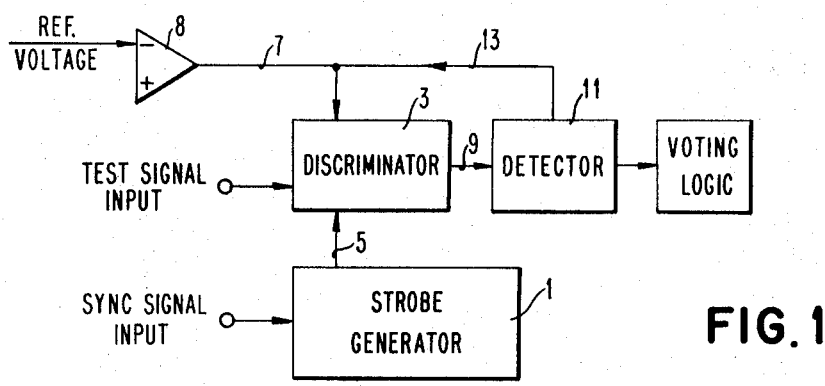
FIG. 1 is a block diagram representation of the go/no-go times circuit.

Referring now to FIG. 1, there is shown a block diagram of the voltage sampling circuit. The strobe generator 1 receives a sync signal input which it transforms into very narrow width pulses which are inputted into a discriminator section 3. The discriminator 3 which operates under the control of the strobe generator 1, provides an output signal which effectively gives the results of the comparison between the input signal level to the discriminator along line 5 and a reference voltage level along line 7. The reference voltage is indicated as being generated by an operational amplifier 8. However, it is recognized by those skilled in the art that other elements may be utilized to achieve this reference potential.

The discriminator output along line 9 which indicates the results of the comparison of the two signals is accepted by a detector 11. The detector 11 serves two functions, first, it passes the informational content of the discriminator comparison to a further decision circuit not shown in this figure; secondly, it presents a reset signal along line 13 which immediately resets the state of the tunnel diode discriminator. It is this immediate reset which provides the sampling circuit with its fast speed of operation relative to the prior art circuits.

Figure 2:
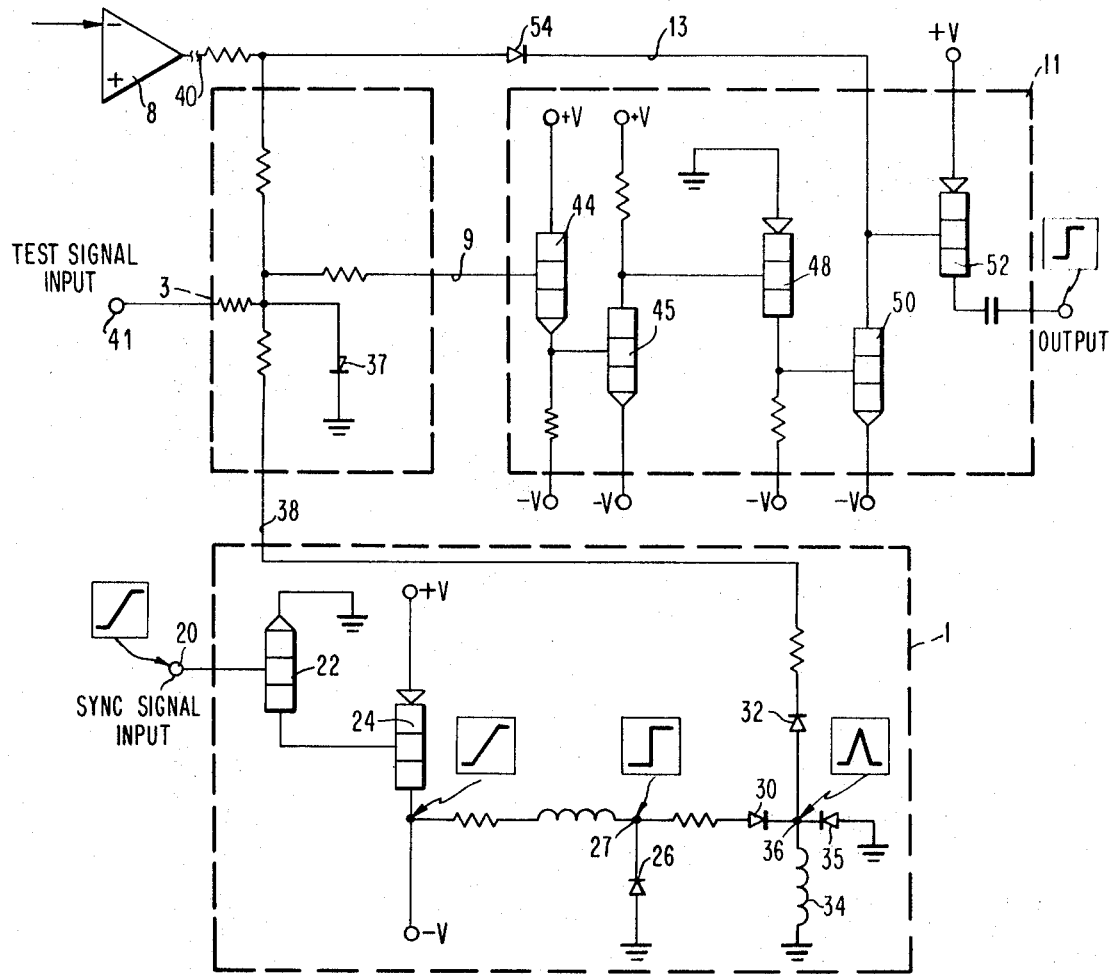
FIG. 2 is a schematic circuit diagram of the go/no-go times circuit.

Referring now to FIG. 2, there is shown a schematic circuit diagram of the blocks shown in FIG. 1. The dashed boxes represent the respective elements in FIG. 1.

The strobe generator receives a synchronous input signal at terminal 20. The introduction of the sync signal at transistor 22 causes the collector of the transistor to go to a negative condition thereby turning on transistor 24 whose base is connected to the collector of 22. The signal at the collector of 24 is shown as a rising positive signal. It is this positive current that switches the snap diode 26 to an off condition causing a fast rising pulse shown at terminal 27 as the beginning of a square pulse. This very fast rise time positive signal creates a positive transition at diodes 30 and 32. Thus, by the effects of coil 34, a very narrow spike pulse is created at node 36 as indicated on the circuit diagram. It is this strobe pulse which is the output of the strobe generator section of the sampling circuit. Diode 35 connected to coil 34 serves the purpose of reducing undershoot.

The discriminator section 3 comprises a single tunnel diode 37. This discriminator diode receives the output of the strobe generator along line 38. In addition to the strobe input signal, tunnel diode 37 receives two other inputs, a reference voltage along line 40 and the test signal of the device under test at terminal 41.

If at the time of strobe signal occurrence the sum of the currents into the tunnel diode 37 is greater that the peak of the tunnel diode, the diode fires thus turning transistor 45 to an on condition. This in turn results in the turning on of transistor 48, 50 and 52. The collector of transistor 50 goes negative when it is in an on condition, thus forward biasing diode 54, thus reducing the current into the tunnel diode discriminator 37 and turning it off. Transistors 45, 48, 50 and 52 then reset to their original state. The output of transistor 52 introduces the signal to a voting logic circuit (not shown). The voting logic circuitry may typically be a binary register which stores a bit of information when a desired signal level is detected during strobe time.

For the purpose of functional testing, the go/no-go circuit is first utilized to determine the voltage magnitudes at the time of the beginning of the pulse and at the time the pulse reaches its maximum value. Once having these magnitudes, then for example, if it is desired to measure the rise time of a circuit under test, the 10 percent and 90 percent levels of the maximum voltage signal are computed by an auxiliary computer (not shown). Then, the electronic delay (element 61'', shown in FIG. 13 of U.S. Pat. Ser. No. 663,710, now U.S. Pat. No. 3,505,598), is varied until signal levels of 10 percent and 90 percent maximum are detected 50 percent of the time by the voting logic circuit. The 50 percent strike level is considered to be an equilibrium point, however, other levels may be selected. After finding the times at which 10 percent and 90 percent equilibrium values occur, the rise time may be calculated by finding the differences between these two times.

While the invention has been particularly shown and described with reference to the preferred embodiment thereof, it will be understood by those skilled in the art that various changes in form and details may be made therein without departing from the spirit and scope of the invention.

What is claimed is:

1. A pulse measuring system for measuring the voltage levels along selected points of a waveform said system having a source of control signals, a means for varying the time of said control signals, a sampling circuit, and a decision circuit, wherein the improvements comprise:

strobe generator means responsive to said control signals for generating a sharp spiked strobe signal;

a signal tunnel diode discriminator for receiving said strobe signals;

reference voltage means connected to said tunnel diode;

test signal input means connected to said tunnel diode for introducing the output signal of a device under test to said tunnel diode discriminator;

detector means further connected to said tunnel diode for monitoring the condition of said tunnel diode;

reset means connected from said detector means to said tunnel diode for instantaneously resetting the condition of said tunnel diode upon detection that the current to said diode has reached a threshold level;

output means from said detector means;

whereby said output signal from said detector indicates that the voltage level of said test signal is at a desired level.

2. The pulse measuring system as defined in claim 1 further comprising voting logic means connected to said output means for determining the time at which the equilibrium point of detections is achieved.

3. The pulse measuring system as defined in claim 2 wherein said strobe generator further comprises a snap diode responsive to a synchronous input signal for generating a narrow strobe pulse.